3,152,165
DIOXABOROLANYL AND DIOXABORINANYL
PHOSPHATE COMPOUNDS
Irving S. Bengelsdorf, Santa Ana, and Kiyoshi Kitasaki, Garden Grove, Calif., assignors to United States Borax & Chemical Corporation, Los Angeles, Calif., a corporation of Nevada
No Drawing. Filed Dec. 6, 1962, Ser. No. 242,599
9 Claims. (Cl. 260—461)

This invention relates to borophosphate compounds, and more particularly, it relates to novel dioxaborolanyl and dioxaborinanyl phosphate compounds having a B—O—P linkage.

It is, therefore, the principal object of this invention to provide, as new compositions, dioxaborolanyl and dioxaborinanyl phosphate compounds.

It is a further object of this invention to provide a method of producing said novel compounds.

Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The present invention provides the compounds of the formula

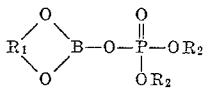

wherein $R_1$ is an alkylene radical of from 2 to 3 carbon atoms in length and containing a total of from 2 to about 20 carbon atoms and $R_2$ is selected from the group consisting of alkyl, aralkyl, and monocyclic aryl radicals.

The compounds can be named as diorgano(1,3-dioxa-2-borolan-2-yl)- or diorgano(1,3-dioxa-2-borinan-2-yl)-phosphates, in which the organo radicals are alkyl, aralkyl or aryl. When $R_1$ is an alkylene radical of 2 carbon atoms in length, the compounds contain a 1,3-dioxa-2-borolane ring. When $R_1$ is an alkylene radical of 3 carbon atoms in length, the boron-containing ring is a 1,3-dioxa-2-borinane. The carbon atoms of the alkylene ring can be unsubstituted, or preferably, they are substituted with one or more alkyl groups, such as the lower alkyl groups having 1 to about 8 carbon atoms.

As set forth above $R_2$ represents an alkyl radical, and especially the lower alkyl radicals having 1 to about 8 carbon atoms, straight or branched chain, an aralkyl radical such as benzyl, or a monocyclic aryl radical such as phenyl and the nuclear-substituted phenyls. Typical examples of radicals which are represented by $R_2$ are methyl, ethyl, n-propyl, isopropyl, n-butyl, sec-butyl, n-pentyl, n-hexyl, sec-octyl, n-octyl, benzyl, phenyl, methoxyphenyl, nitrophenyl, halophenyl such as chlorophenyl and bromo phenyl, and lower alkylphenyl such as cresyl and ethylphenyl.

It will be noted from the foregoing discussion that the $R_2$ moieties of the present compounds can be any alkyl, aralkyl, or monocyclic aryl radical. The above paragraph enumerates a number of illustrative examples of each of the particular $R_2$ moieties and it would be unnecessarily redundant to specifically name all member of such groups. Thus, it is the full intention of this invention to include all alkyl, aralkyl and monocyclic aryl groups as $R_2$ moieties, and that the present invention comprises the defined organoborates and organophosphates having the defined noved —B—O—P— linkage.

The compounds of the present invention which contain the defined organoborate and organophosphate moieties with the novel —B—O—P— linkage are useful as herbicides when used either as a pre-emergence or post-emergence treatment. They are also useful as additives for gasoline, such as to suppress preignition of the fuel and spark plug fouling.

The compounds are readily prepared by reaction of the corresponding organo halophosphate with an alkylene glycol borate. The reaction can be illustrated by the equation

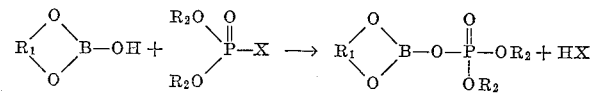

wherein $R_1$ and $R_2$ have the significance previously assigned and X represents a holgen atom, especially chlorine or bromine. The reaction takes place at relatively low temperatures, such as in the range of about 20° to 60° C., in a short period of time, although somewhat higher or lower temperatures can also be used with success. Substantially equimolar amounts of reactants are used for best yield of the desired product. Preferably, the reaction is run in the presence of a tertiary amine, such as pyridine or triethylamine, to neutralize the by-product hydrogen halide as it is formed. The use of an inert liquid reaction medium such as diethyl ether or the hydrocarbon solvents aids in controlling the reaction temperature and, also, facilitates the removal of the insoluble amine hydrohalide at the end of the reaction period. The product is isolated by conventional procedures, as for example, by filtration to remove the insoluble amine hydrohalide followed by evaporation of the solvent.

The intermediate compounds are well known to the art and readily available. For example, many of the halophosphates are commercially available. The alkylene glycol borates can be prepared by reaction of orthoboric acid with the corresponding glycol, such as described by U.S. Patent No. 2,741,548.

The following examples are presented to illustrate the method of producing the compounds of this invention, but it is to be understood that the invention is not to be limited to the specific examples given.

EXAMPLE I

Diphenyl(4,4,6-Trimethyl-1-1,3-Dioxa-2-Borinan-2-Yl) Phosphate

To a stirred solution of 28.8 grams (0.2 mole) of 2-hydroxy-4,4,6-trimethyl-1,3-dioxa-2-borinane and 15.8 grams (0.2 mole) of pyridine in 60 ml. of diethyl ether was added a solution of 53.8 grams (0.2 mole) of diphenyl chlorophosphate in 40 ml. of diethyl ether. The addition, which was over a period of about 5 minutes, was carried out at about room temperature under a nitrogen atmosphere. The mixture then was stirred at 25° C. for one hour followed by reflux for one hour. The insoluble pyridine hydrochloride was separated by filtration under nitrogen and washed with a small amount of ether. The filtrate was concentrated under reduced pressure and additional pyridine hydrochloride removed by filtration. The remaining ether was removed in vacuo and the residual viscous liquid heated for a short time at reduced pressure (0.3 mm.), separating a white sublimate of unreacted glycol borate from the liquid. The product was collected as an amber-colored liquid residue weighing 63.5 grams; $n_D^{22}$ 1.5137. Analysis of the product gave the following results: Calculated for $C_{18}H_{22}O_6BP$: C, 57.47; H, 5.90; P, 8.24. Found: C, 55.96; H, 5.99; P, 8.67.

EXAMPLE II

*Di-N-Butyl(4,4,6-Trimethyl-1,3-Dioxa-2-Borinan-2-Yl) Phospate*

To a stirred solution of 13.55 grams (0.094 mole) of 2-hydroxy-4,4,6-trimethyl-1,3-dioxa-2-borinane and 7.43 grams (0.094 mole) of pyridine in 50 ml. of diethyl ether was added, at about room temperature, 21.48 grams (0.094 mole) of di-n-butyl chlorophosphate. The mixture was stirred for one hour at room temperature and then refluxed for one hour at 40° C. The insoluble pyridine hydrochloride was separated by filtration under nitrogen and washed with ether. The combined filtrate and ether wash solution was concentrated, precipitating additional insoluble material, which was removed by filtration. The filtrate was heated at 0.5 mm. to remove the remaining ether and a small amount of white sublimate of unreacted glycol borate. The product was collected as the liquid residue weighing 21.6 grams; $n_D^{22.5}$ 1.4376. Analysis of the product gave the following results: Calculated for $C_{14}H_{30}O_6BP$: C, 50.01; H, 9.00; P, 9.22. Found: C, 49.78; H, 9.51; P, 10.33.

EXAMPLE III

*Diethyl(4,4,6-Trimethyl-1,3-Dioxa-2-Borinan-2-Yl) Phosphate*

To a stirred solution of 14.98 grams (0.104 mole) of 2-hydroxy-4,4,6-trimethyl-1,3-dioxa-2-borinane and 8.23 grams (0.104 mole) of pyridine in 100 ml. of diethyl ether was added 17.8 grams (0.104 mole) of diethyl chlorophosphate, and the resulting solution stirred at room temperature for about 18 hours. The insoluble material was separated by filtration under nitrogen and washed with ether. The filtrate was concentrated and the additional insoluble material removed by filtration. The filtrate was heated at 0.9 mm. to remove all volatile materials and the product collected as a viscous, amber-colored residue weighing 21 grams; $n_D^{24.5}$ 1.4295. The product had the following analysis: Calculated for $C_{10}H^{22}O_6BP$: C, 42.88; H, 7.92; P, 11.06. Found: C, 41.17; H, 7.76; P, 11.73.

EXAMPLE IV

*Diphenyl(4-Methyl-1,3-Dioxa-2-Borolan-2-Yl)Phosphate*

The procedure of Example III was repeated using 10.2 grams (0.1 mole) of 2-hydroxy-4-methyl-1,3-Dioxa-2-borolane, 7.9 grams (0.1 mole) of pyridine and 26.9 grams (0.1 mole) of diphenyl chlorophosphate. The product (20 grams) was obtained as a viscous oil; $n_D^{24.5}$ 1.5372. The product had the following analysis: Calculated for $C_{15}H_{16}O_6BP$: C, 53.92; H, 4.83; P, 9.27. Found: C, 55.90; H, 5.20; P, 9.56.

The following are among the many other compounds embraced by the present invention, and may be prepared according to the directions given above:

Di-n-propyl(4-methyl-1,3-dioxa-2-borinan-2-yl) phosphate

Di-o-cresyl(4,4,6-trimethyl-1,3-dioxa-2-borinan-2-yl) phosphate

Di-n-octyl(4-methyl-1,3-dioxa-2-borolan-2-yl)phosphate

Di-p-chlorophenyl(4,4,5,5-tetramethyl-1,3-dioxa-2-borolan-2-yl)-phosphate

Di-p-nitrophenyl(5-methyl-5-n-propyl-1,3-dioxa-2-borinan-2-yl)phosphate

Di-m-methoxyphenyl(4,4,6-trimetheyl-1,3-dioxa-2-borinan-2-yl)-phosphate

Dibenzyl(4,4,6-trimethyl-1,3-dioxa-2-borinan-2-yl)-phosphate

The following example is presented to illustrate the herbicidal activity of representative compounds of this invention when used as a post-emergence treatment.

EXAMPLE V

Greenhouse flats were planted to corn, oats, ryegrass, mustard, millet, peas, cucumbers and beans. The growing medium was vermiculite, to which 1 liter of a complete nutrient solution (Hoagland's solution) was added at planting and at 10-day intervals thereafter. Seven days after planting, the plants were sprayed with an acetone solution of the compounds shown in Table A, at a rate of 8, 15, 25 and 40 pounds of the active compound per acre and spray volume of 124 gallons per acre. Fourteen days after treatment, the plants were examined and the herbicidal activity rated as in Table A. The plants were rated on a 0 to 10 basis, with 0 meaning no effect, and 10 meaning total kill of plants.

TABLE A

| Compound | Appln. Rate (lb./A.) | Herbicidal Rating On | | | | | | | |
|---|---|---|---|---|---|---|---|---|---|
| | | Corn | Oats | Rye-grass | Millet | Mus-tard | Peas | Cucum-ber | Beans |
| Diphenyl (4,4,6-trimethyl-1,3-dioxa-2-borinan-2-yl)-phosphate | 8 | 0 | 1 | 0 | 0 | 1 | 0 | 2 | 1 |
| | 15 | 0 | 1 | 0 | 0 | 9 | 0 | 6 | 2 |
| | 25 | 0 | 1 | 1 | 2 | 9 | 0 | 8 | 3 |
| | 40 | 0 | 1 | 2 | 6 | 9 | 0 | 9 | 3 |
| Di-n-butyl (4,4,6-trimethyl-1,3-dioxa-2-borinan-2-yl)-phosphate | 8 | 1 | 2 | 1 | 10 | 9 | 0 | 9 | 3 |
| | 15 | 1 | 3 | 2 | 9 | 10 | 0 | 10 | 5 |
| | 25 | 2 | 3 | 2 | 9 | 10 | 0 | 10 | 5 |
| | 40 | 5 | 3 | 2 | 10 | 9 | 0 | 10 | 5 |

Other modes of applying the principle of the invention may be employed, change being made as regards the details described, provided the features stated in any of the following claims or the equivalent of such be employed.

We, therefore, particularly point out and distinctly claim as our invention:

1. A compound of the formula

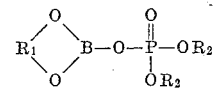

where $R_1$ is alkylene of from 2 to 3 carbon atoms in length and containing a total of from 2 to about 20 carbon atoms, and $R_2$ is selected from the group consisting of alkyl, benzyl, phenyl, lower alkoxyphenyl, nitrophenyl, halophenyl, and lower alkylphenyl.

2. Di-lower alkyl(1,3-dioxa-2-borolan-2-yl)phosphate.

3. Di-lower alkyl(1,3-dioxa-2-boronan-2-yl)phosphate.

4. Di-n-butyl(4,4,6-trimethyl-1,3-dioxa-2 - borinan - 2 - yl)phosphate.

5. Diphenyl(4,4,6-trimethyl-1,3-dioxa-2 - borinan - 2 - yl)phosphate.

6. Diethyl(4,4,6-trimethyl-1,3-dioxa - 2 - borinan - 2 - yl)phosphate.

7. Diphenyl(4-methyl-1,3-dioxa - borolan - 2 - yl)-phosphate.

8. The method of producing a compound of the formula

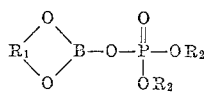

which comprises reacting substantially equimolar amounts of a compound of the formula

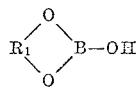

with a halophosphate of the formula

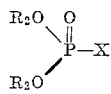

where $R_1$ is alkylene of from 2 to 3 carbon atoms in length and containing a total of from 2 to about 20 carbon atoms, $R_2$ is selected from the group consisting of alkyl, benzyl, phenyl, lower alkoxyphenyl, nitrophenyl, halophenyl, and lower alkylphenyl, and X is a halogen atom selected from the group consisting of bromine and chlorine.

9. The method of claim 8 in which said reaction takes place in the presence of a substantially equimolar amount of pyridine.

References Cited in the file of this patent
UNITED STATES PATENTS

| | | |
|---|---|---|
| 3,013,046 | Denny et al. | Dec. 12, 1961 |
| 3,014,952 | Birum et al. | Dec. 26, 1961 |
| 3,031,280 | Fay et al. | Apr. 24, 1962 |
| 3,031,401 | Thayer | Apr. 24, 1962 |
| 3,083,223 | Wright | Mar. 26, 1963 |

OTHER REFERENCES

Zemylanskii et al.: "Chemical Abst.," vol. 51, col. 3551 (1957).

Kosolapoff: "Organo-Phosphorus Compounds," John Wiley & Sons, New York, N.Y. (1950), p. 335.